(12) United States Patent
Mori et al.

(10) Patent No.: US 6,941,966 B2
(45) Date of Patent: Sep. 13, 2005

(54) OUTFLOW-LIMITING DEVICE OF FUEL TANK

(75) Inventors: Eishin Mori, Aichi (JP); Tomohide Aoki, Aichi (JP); Keisuke Yoshida, Aichi (JP); Norihiro Yamada, Aichi (JP); Katsuyuki Kido, Seto (JP)

(73) Assignees: Toyoda Gosei, Co., Ltd., Aichi-ken (JP); FTS Co., Ltd., Aichi-ken (JP)

( * ) Notice: Subject to any disclaimer, the term of this patent is extended or adjusted under 35 U.S.C. 154(b) by 0 days.

(21) Appl. No.: 10/304,852

(22) Filed: Nov. 27, 2002

(65) Prior Publication Data

US 2003/0098063 A1 May 29, 2003

(30) Foreign Application Priority Data

Nov. 29, 2001 (JP) ..................................... P2001-364172

(51) Int. Cl.[7] ............................................... F16K 24/04
(52) U.S. Cl. ........................................ 137/202; 137/43
(58) Field of Search ................................... 137/43, 202

(56) References Cited

U.S. PATENT DOCUMENTS

| | | | | |
|---|---|---|---|---|
| 4,781,218 A | * | 11/1988 | Mori et al. | 137/202 |
| 4,982,757 A | * | 1/1991 | Ohasi et al. | 137/202 |
| 5,535,772 A | * | 7/1996 | Roetker et al. | 137/202 |
| 5,577,526 A | * | 11/1996 | Kasugai et al. | 137/202 |
| 5,680,848 A | | 10/1997 | Katoh et al. | |
| 6,016,827 A | * | 1/2000 | Dawson | 137/202 |
| 6,557,595 B2 | * | 5/2003 | Ozaki | 137/202 |

FOREIGN PATENT DOCUMENTS

| | | |
|---|---|---|
| DE | 198 53 615 A1 | 6/1999 |
| FR | 2 781 728 | 2/2000 |
| JP | A-2-112658 | 4/1990 |
| JP | A-11-229984 | 8/1999 |

* cited by examiner

Primary Examiner—Gerald A. Michalsky
(74) Attorney, Agent, or Firm—Posz Law Group, PLC

(57) ABSTRACT

A device includes a housing fixed to an upper wall of a fuel tank, and having a communication opening in communication with a canister, a float valve received within the housing and floating on a fuel, and the float valve moving upward and downward so as to close and open the communication opening, and a tubular member communicating with the housing, and extending downwardly from the housing into the interior of the fuel tank. The device has through holes of a small diameter which are disposed near an upper wall of the fuel tank, and when the liquid level of the fuel in the fuel tank reaches the lower end opening of the tubular member, a pressure within the fuel tank increases, whereby the filling-up of the fuel tank is detected. When the liquid level of the fuel abnormally rises, the float valve closes the communication opening.

19 Claims, 7 Drawing Sheets

OUTFLOW-LIMITING DEVICE OF FUEL TANK

The present application is based on Japanese Patent Application No. 2001-364172, which is incorporated herein by reference.

BACKGROUND OF THE INVENTION

This invention relates to improved structure of a cutoff valve and full-tank detection means provided in a tank, which is suitably adapted to fuel tank of an automobile.

A vaporized-fuel circulation system, called an evaporation circuit, is provided in the vicinity of a fuel tank of an automobile. Vaporized fuel is fed from the fuel tank to an external canister by this evaporation circuit, and is adsorbed by activated carbon or the like to be temporarily stored therein, thereby preventing the increase of an internal pressure of the fuel tank due to the increase of the vapor pressure. The canister is connected to an engine, and the vaporized fuel is expelled from the activated carbon by a negative intake pressure of the engine, and is mixed with a fuel-air mixture, and the adsorbed vaporized fuel is thus again used as the fuel.

In this evaporation circuit, naturally, an opening, called an evaporation opening, is formed in the fuel tank. Generally, this evaporation opening is formed in an uppermost portion of the fuel tank in order to prevent liquid fuel from flowing into the evaporation circuit. However, there is a fear that the liquid fuel flows into the evaporation opening when the liquid level of the fuel moves up and down. If the liquid fuel flowed as far as the canister, this liquid fuel would be adsorbed by the activated carbon, so that the adsorption of the vaporized fuel by the activated carbon would be adversely affected.

Therefore, a cutoff valve has heretofore been provided at the evaporation opening. In many cases, a float valve is used as the cutoff valve as described later. When the liquid level of the fuel rises beyond a predetermined normal level, the float valve floats up because of its buoyancy to close the evaporation opening, thereby preventing the liquid fuel from flowing into the evaporation circuit.

Full-tank detection means for detecting the filling-up of the fuel tank at the time of refueling is provided at the fuel tank. In many cases, this full-tank detection means comprises a float valve as described later, and this float valve closes an opening in the fuel tank so as to increase the internal pressure of the fuel tank, thereby automatically stopping the operation of a refueling gun.

For example, JP-A-11-229984 discloses a device which comprises a shut-off valve for flowing gas, containing fuel vapor produced in a large amount at the time of refueling, to a canister, and a cutoff valve for flowing the gas, containing the fuel vapor, to the canister during the time when the refueling is not effected.

Figure 8:
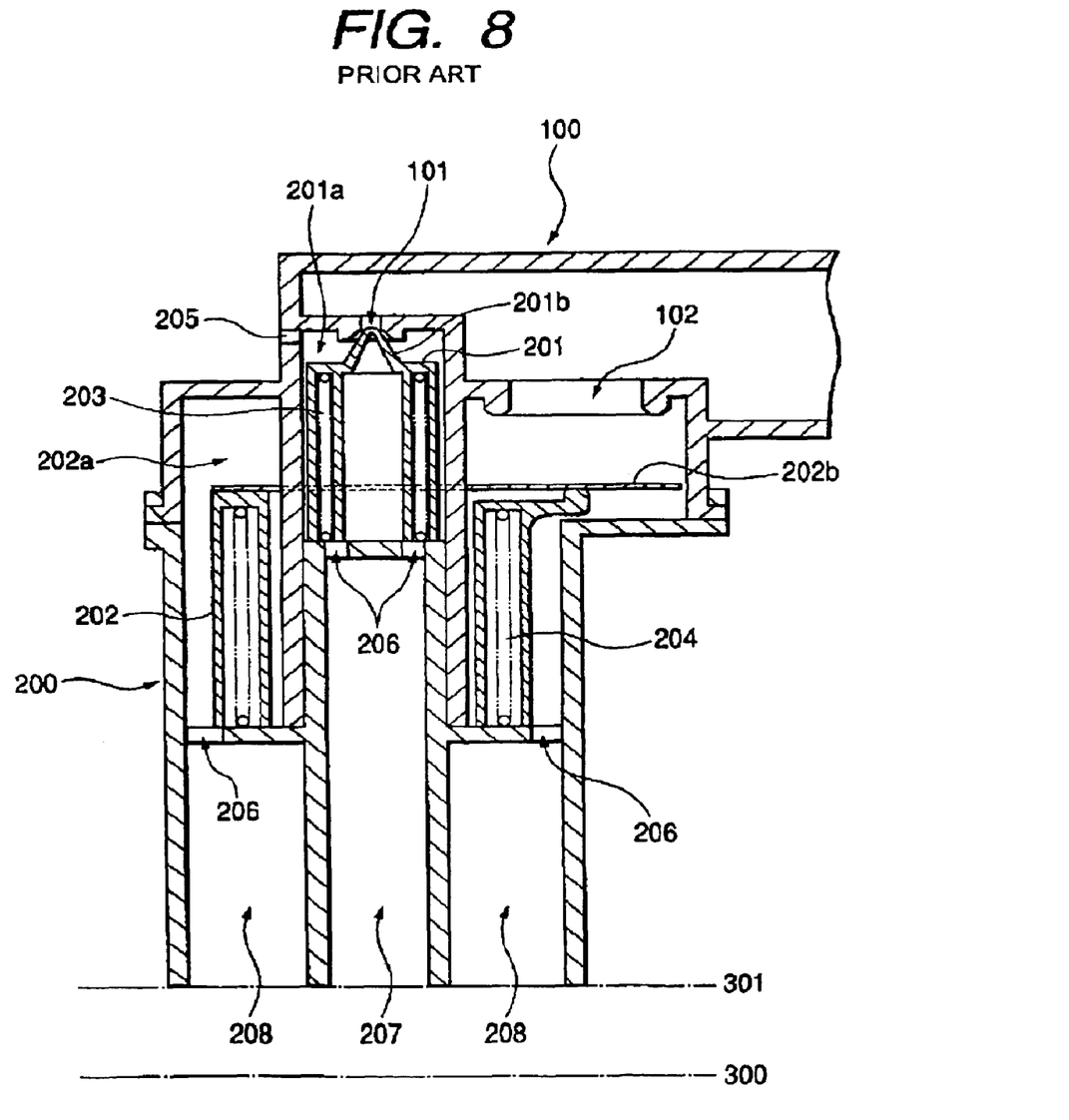
FIG. 8 is a cross-sectional view of a conventional fuel outflow-limiting device.

This device is provided at an upper wall of the fuel tank, and comprises an upper housing 100 and a lower housing 200 as shown in FIG. 8. The upper housing 100 is in communication with the canister (not shown). The upper housing 100 and the lower housing 200 communicate with each other via a first communication passage 101 of a smaller diameter and a second communication passage 102 of a larger diameter.

A first float 201 and a second float 202 are provided in the lower housing 200, and the first float 201 is provided in a first space 201a of a tubular shape, and the second float 202 is provided in a second space 202a of an annular shape formed around the first space 201a in isolated relation thereto. The second float 202 is formed into a tubular shape.

The first float 201 has a valve member 201b formed at its upper end, and the second float 202 has a valve member 202b formed at its upper end, and when the liquid level of the fuel moves up and down, the valve member 201b closes and opens the first communication passage 101, and also the valve member 202b closes and opens the second communication passage 102. The first float 201 and the second float 202 are urged upward by springs 203 and 204, respectively, but before the first float 201 or the second float 202 is floated up by the liquid fuel, the valve member 201b or the valve member 202b opens the first communication passage 101 or the second communication passage 102.

A small hole 205 is formed in an upper portion of the lower housing 200, and the first space 201a communicates with a gas phase portion of the fuel tank via the small hole 205. Further, communication holes 206 are formed in bottom portions of the first and second spaces 201a and 202a, respectively, and each of the first and second spaces 201a and 202a communicates with the interior of the fuel tank via the corresponding communication hole 206. The lower housing 200 includes a central tubular portion 207, which extends downwardly from the first space 201a, and is open to a lower end of this lower housing, and an annular tubular portion 208 which extends downwardly from the second space 202a in surrounding relation to the central tubular portion 207, and is open to the lower end of this lower housing.

In this device, in the case where the liquid level of the fuel is disposed at a position 300 lower than the lower end of the lower housing 200, the vaporized fuel enters the first space 201a and the second space 202a via the respective communication holes 206, and flows through the first and second communication passages 101 and 102 into the canister via the upper housing 100. Also, there is another flow of vaporized fuel which enters the first space 201a via the small hole 205, and flows into the canister via the first communication passage 101 and the upper housing 100. As a result, the internal pressure of the fuel tank will not increase, and therefore the refueling operation proceeds smoothly.

Then, after the liquid level of the fuel reaches a position 301 of the lower end of the lower housing 200, the pressure within the central tubular portion 207 becomes higher than the pressure within the fuel tank, and therefore the liquid level of the fuel rises only within the annular tubular portion 208, and the fuel enters the second space 202a through the communication hole 206 to float the second float 202. When the second float 202 thus floats, so that the valve member 202b closes the second communication passage 102, the pressure within the fuel tank abruptly increases, so that an automatic stop function of a refueling gun is exercised, thereby stopping the refueling. Therefore, the filling-up of the fuel tank can be detected.

When the liquid surface of the fuel is disturbed to rise, for example, during the travel of the car, the second float 202 first floats up to close the second communication passage 102, thereby preventing the liquid fuel from flowing into the upper housing 100. When the liquid surface is more vigorously disturbed to rise, the first float 201 also floats up to close the first communication passage 101, thereby preventing the liquid fuel from flowing into the upper housing 100.

In the above device, there are provided the two float valves and the two communication passages, and therefore there is encountered a problem that it is difficult to design the device in such a manner that each of the two float valves can operate accurately. There is another disadvantage that the cost is high since the number of the component parts is rather large. And, the second float 202 and the second space 202a are large in diameter, and this invites a problem that the mounting space is much limited.

Furthermore, in the case where this device is used in fuel tanks of different shapes and capacities, it is necessary to produce many kinds of lower housings 200 and second floats 202, having different shapes, and this invites a problem that much time and labor are required,

SUMMARY OF THE INVENTION

This invention has been made under the above circumstances, and an object of the invention is to provide a structure which enables a cutoff operation and a full-tank detection with a simpler construction, and can be easily applied to many kinds of fuel tanks.

The above problems have been solved by a fuel outflow-limiting device of a fuel tank of the invention characterized in that the device comprises a housing, which is fixed to an upper wall of the fuel tank, and has a communication opening in communication with a canister; one float valve which is received within the housing, and floats on a liquid fuel, and moves upward and downward in accordance with the upward and downward movement of a liquid level of the fuel so as to close and open the communication opening; and one tubular member which communicates with the housing, and extends downwardly from the housing into the interior of the fuel tank, and is open at its lower end;

the housing has a through hole of a small diameter which is disposed near to an inner surface of an upper wall of the fuel tank, and communicates the inside and outside of the housing with each other, and when the liquid level of the fuel in the fuel tank reaches the lower end opening of the tubular member, a pressure within the fuel tank increases, so that the tubular member detects the filling-up of the fuel tank, and when the liquid level of the fuel rises beyond a predetermined normal level, the float valve closes the communication opening.

Preferably, the tubular member is separate from the housing, and is hermetically fixed to the housing. Preferably, an upwardly-open tubular portion is formed within the housing, and is disposed around an outer periphery of the float valve.

Another aspect of the invention provides an outflow-limiting device of a tank, comprising:

a housing forming a float valve chamber therein and provided with a communication opening to an outside of the fuel tank;

tubular member communication and extending downward from the housing in a direction of liquid level of a fuel and having a lower end opening at a lower end thereof;

a through hole having a smaller diameter than the lower end opening, formed on a position upper than the lower end opening so as to communicate with the tubular member or the float valve chamber;

a float valve provided in the float valve chamber and having a valve member for closing the communication opening;

wherein the tubular member is pronged into the fuel when the liquid level of the fuel reaches a first liquid level of the fuel so that communication of the tubular member to a gas phase located on an upper portion on the inside of the fuel tank is cut, whereby evacuation of vaporized fuel decreases.

In a fuel outflow-limiting device of the present invention, in a normal condition in which a liquid level of fuel is disposed below a tubular member, a float valve is supported within a housing because of its own weight, and opens a communication opening leading to a canister, as in the conventional structure. Therefore, gas within the fuel tank passes through the tubular member and the housing, and flows into a canister via the communication opening, thereby adjusting the pressure within the fuel tank.

When the liquid level of the fuel within the fuel tank rises to reach a lower end opening of the tubular member at the time of refueling, gas within the fuel tank enters the housing only via through holes of a small diameter formed in the housing, and at this time the through holes offer a high resistance to the passage of the gas. Therefore, when the liquid level of the fuel rises to reach the lower end opening of the tubular member, the pressure within the fuel tank increases, thereby automatically stopping the operation of a refueling gun. Namely, the filling-up of the fuel tank can be detected by the tubular member, and the liquid level of the fuel, representing the full-tank position, can be adjusted by adjusting the length of the tubular member. Incidentally, the filling-up of the fuel tank in this application means a state that the level of the fuel in the tank reaches at a level in which the refuel gun is automatically stopped.

When the liquid level of the fuel abnormally rises beyond the predetermined level because of acceleration and so on during the travel of the vehicle, so that the float valve floats, the float valve is pressed against the communication opening portion because of its buoyancy to close this communication opening. As a result, the liquid fuel is prevented from flowing into the canister via the communication opening, and the float valve functions as a cutoff valve.

The housing may be integral with the fuel tank or may be separate from the fuel tank. The housing may be provided in a gas phase portion of the fuel tank or may be arranged to extend through an upper wall of the fuel tank. A method of fixing the housing and the fuel tank together is not particularly limited to welding, fastening by bolts and the integral molding of the two members. Although generally, the communication opening, communicating with the canister, is provided at the uppermost portion of the housing, this communication opening is not particularly limited to any specified position in so far as the float valve can close the communication opening by its buoyancy. The communication opening, leading to the canister, may have any suitable shape in so far as the float valve can close it.

The through holes of a small diameter, formed in the housing, communicate the interior of the fuel tank with the interior of the housing, and the number and diameter of the through holes are important. If the diameter of the through holes is too large or the number of the through holes is too large, it is difficult to increase the internal pressure of the fuel tank when the fuel tank becomes full, and therefore it is difficult to automatically stop the operation of the refueling gun. If the diameter of the through holes is too small or the number of the through holes is too small, it is difficult to flow the gas within the fuel tank into the canister, so that the cutoff valve fails to properly adjust the internal pressure. Therefore, the diameter and number of the through holes need to be accurately determined in a trial-and-error manner in accordance with the capacity of the fuel tank and so on. In order to prevent the liquid fuel from entering the housing, it is preferred to provide the through holes as close to the upper surface of the fuel tank as possible.

The float valve can be similar in material and shape to conventional float valves. The float valve may be so constructed that it can float only by the difference between its apparent specific gravity and the specific gravity of the fuel, or the float valve may use a urging force of a spring or the like so as to assist its buoyancy.

Further the sealing member may include a seal aperture connected to the communication opening and having a smaller diameter than the communication opening and a seal projection configured to be openable and closable of the seal aperture.

Preferably, the float valve has a double-seal structure in which an inner seal member is held in the float valve so as to move upward and downward as disclosed, for example, in JP-A-2-112658. In such a structure, there is eliminated a disadvantage that the float valve fails to move downward even when the liquid level descends after the float valve is brought into intimate contact with the communication opening portion leading to the canister. Therefore, the dynamic sealing ability is enhanced when the liquid surface of the fuel is vigorously disturbed to rise, and therefore the function of the cutoff valve is more effectively performed.

Preferably, an upwardly-open tubular portion is formed within the housing, and is disposed around the outer periphery of the float valve. By forming this tubular portion, the liquid fuel, passing through the through holes of a small diameter in the housing, impinge on the tubular portion, and the flow of the liquid fuel is regulated, so that the liquid fuel is prevented from intruding into the communication opening leading to the canister, and the inflow of the liquid fuel can be prevented more positively. Preferably, the level of this tubular portion is higher than the upper surface of the float valve located in its lower position in the normal condition.

The length of the tubular member is so determined that the lower end opening thereof is disposed at the liquid level of the fuel when the fuel tank is full of the fuel. Therefore, the length of the tubular member varies depending on the capacity and shape of the fuel tank, but in the present invention the full-tank detection can be effected merely by adjusting the length of the tubular member. Therefore, if the tubular member is formed into the maximum length, the full-tank liquid level position can be defined merely by cutting the tubular member into a desired length in accordance with the car kind or the like, and therefore it is not necessary to produce various fuel outflow-limiting devices for different fuel tanks, and the time and labor can be greatly reduced. The tubular member can be separate from the housing, and a plurality of kinds of tubular members of desired lengths can be prepared.

The tubular member may be fixed to the lower portion of the housing, or the upper end portion serves also as a peripheral wall of the housing. Preferably, at least the lower end opening of this tubular member is smaller in diameter than the housing. With this construction, even when the liquid level of the fuel is disturbed to rise during the refueling operation, the full-tank detection can be effected accurately.

DETAILED DESCRIPTION OF THE PREFERRED EMBODIMENTS

The present invention will now be specifically described by way of preferred embodiments.
(First Embodiment)

Figure 1:
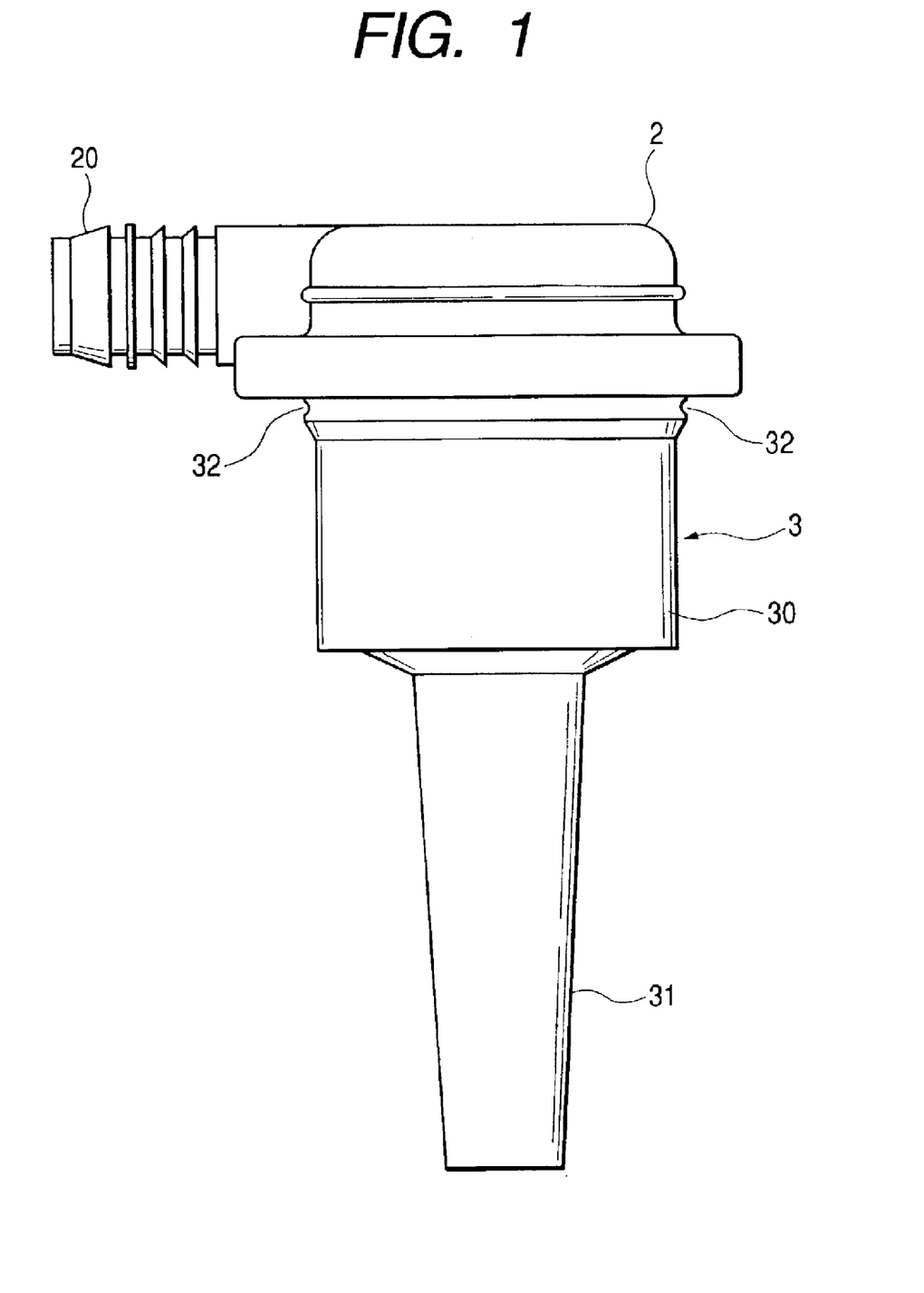
FIG. 1 is a front-elevational view of one preferred embodiment of a fuel outflow-limiting device of the present invention.
Figure 2:
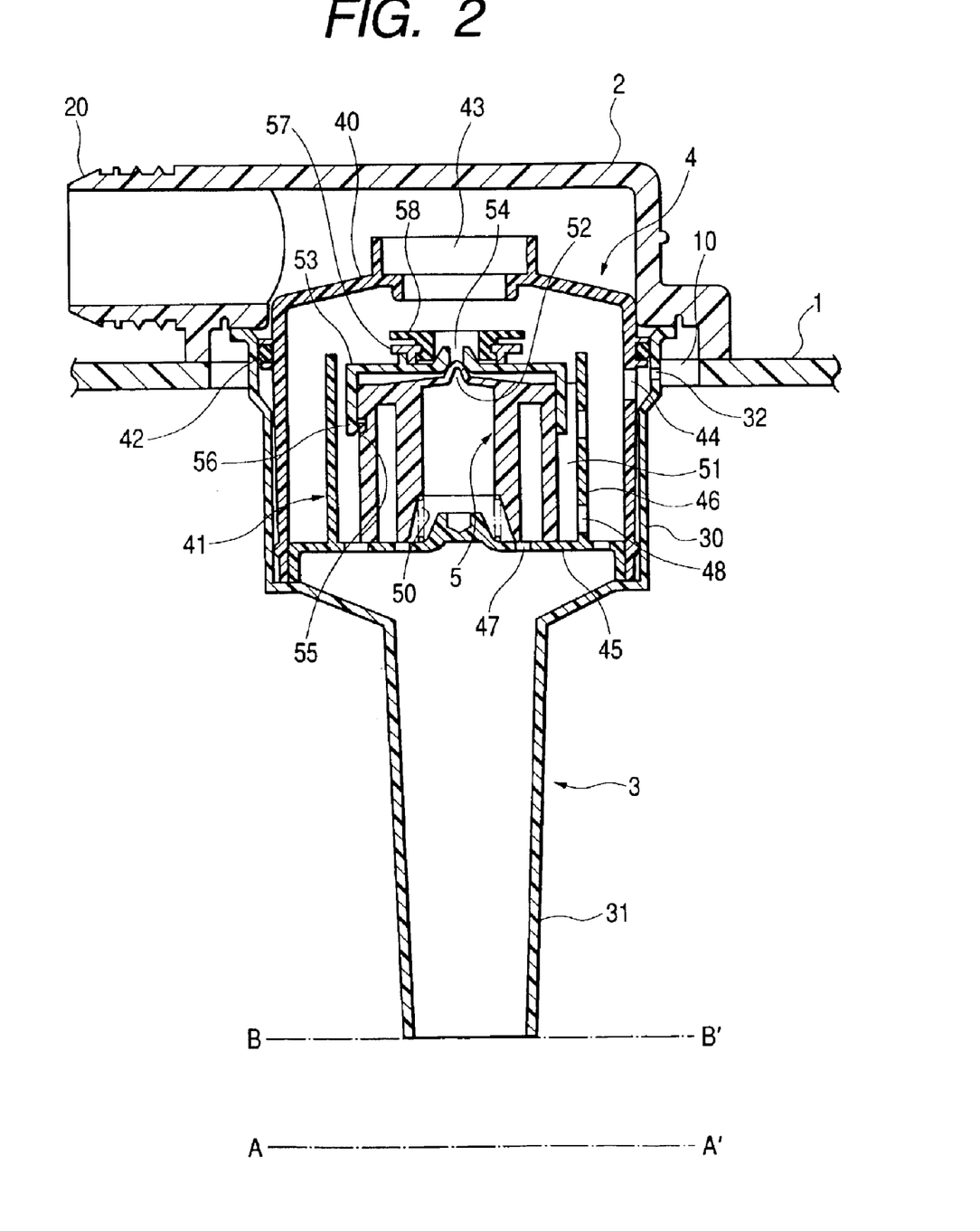
FIG. 2 is a cross-sectional view thereof of the fuel outflow-limiting device of the above embodiment.

FIG. 1 is a front-elevational view of one preferred embodiment of a fuel outflow-limiting device of the present invention, FIG. 2 is a cross-sectional view thereof. This fuel outflow-limiting device mainly comprises a lid member 2, which is fixed by welding to an upper surface of an automotive gasoline tank 1 (made of a resin), and is disposed above an opening 10 formed in an upper wall of the gasoline tank 1, a tubular member 3 fixed by welding to a lower surface of the lid member 2, a housing 4 formed at an upper portion of the tubular member 3, and a float valve 5 mounted in the housing 4 so as to move upward and downward in a direction of the liquid level.

The lid member 2 is injection molded of a polyethylene resin and a polyamide resin, and includes a nipple 20 extending parallel to the upper surface of the gasoline tank 1, and a tube, communicating with a canister, is adapted to be fitted on this nipple 20.

The tubular member 3 is injection molded of a polyamide resin, and has a two-stage structure having a larger-diameter portion 30 and a smaller-diameter portion 31. The larger-diameter portion 30 is welded at its upper end to the lower surface of the lid member 2 to form the housing 4. The smaller-diameter portion 31 extends substantially vertically into the gasoline tank 1, and has such a length that its lower end opening is disposed at a liquid level of fuel when the gasoline tank 1 is full. Through holes 32 of a small diameter are formed through that portion of a side wall of the larger-diameter portion 30 disposed at an uppermost portion of the gasoline tank 1, and the interior of the tubular member 3 is in communication with a gas phase portion of the gasoline tank 1 via the through holes 32.

An upper member 40 of an inverted cup-shape and a lower member 41 (which is fitted in the upper member 40, and is fixed to a lower end opening thereof) are held in the larger-diameter portion 30 of the tubular member 3. The upper member 40 is abutted at its lower end against a step portion of the tubular member 3, and an outer peripheral surface of this upper member is held in hermetic contact with the larger-diameter portion 30 of the tubular member 3 through an O-ring 42, and in this manner the upper member 40 is held in the tubular member 3 in fixed relation thereto. A communication opening 43, which is in communication with the canister (not shown), is formed in an uppermost portion of the upper member 40, and communication holes 44, communicating the inside and outside of the upper member 40 with each other, are formed through that portion of the peripheral wall of this upper member which is disposed below the O-ring 42, and are opposed to the through holes 32, respectively.

The lower member 41 includes an end plate 45, fitted in the lower open end portion of the upper member 40 in fixed relation thereto, and a tubular portion 46 extending upwardly from the end plate 45. A plurality of communication holes 47 are formed through the end plate 45, that is, extend between upper and lower surfaces of this end plate, and a plurality of communication holes 48, communicating the inside and outside of the tubular portion 46 with each other, are formed through the tubular portion 46.

The float valve 5 is provided within the tubular portion 46, and is placed on the upper surface of the end plate 45 through a spring 50. A plurality of vertically-extending ribs 51 are formed on an outer peripheral surface of the float valve, and the float valve can be moved upward and downward in such a manner that the ribs 51, held in contact with an inner peripheral surface of the tubular portion 46, are guided by this inner peripheral surface. A seal projection 52 is formed at an upper end of the float valve 5. A seal member 53 of a tubular shape, having a closed bottom, is held on an upper portion of the float valve 5 so as to move upward and downward relative to this float valve, and a seal aperture 54 is formed through a central portion of the seal member 53, and is opposed to the seal projection 52.

The seal member 53 is held on the float valve 5, with its bottom disposed at the upper side. A plurality of engagement grooves 55 are formed in the outer peripheral surface of the float valve 5, and claws 56, formed at an open end of the seal member 53, are engaged in these engagement grooves, respectively. The engagement grooves 55 are larger in length than the claws 56, and the seal member 53 can slightly move upward and downward relative to the float valve 5. When the float valve 5 and the seal member 53 are moved relative to each other in a direction toward each other, the seal projection 52 of the float valve 5 closes the seal aperture 54 in a sealing manner.

The float valve 5 and the seal member 53 are made of a POM resin, and the apparent specific gravity of the two members is made lower than the specific gravity of gasoline (fuel) by their shapes and urging of the spring 50 so that the two members can float on liquid gasoline. The spring 50 is held between the lower end of the float valve 5 and the end plate 45 of the housing 4, and therefore is held in such a condition that a urging force is stored in this spring 50. However, this urging force is smaller than the sum of the weights of the float valve 5 and seal member 53, and in the atmosphere and in gasoline vapor, the float valve 5 and the seal member 53 press the spring 50 by their own weights, so that the lower end surface of the float valve 5 is abutted against the end plate 45 of the lower member 41. Thus an apparent buoyancy of the float valve 5 and the seal member 53 is generated by a shape of the float valve 5 and urging of the spring 50, so that the seal member 53 urgingly closes the communication opening 43 when the liquid gasoline reaches at the predetermined liquid level.

A ring-like valve seat 57 is fixed by welding to the upper surface of the seal member 53, and a valve member 58, made of rubber, is fitted in the valve seat 57 in fixed relation thereto. When the seal member 53 moves upward in accordance with the upward movement of the float valve 5, the valve member 58 is brought into sealing engagement with a lower peripheral edge of the communication opening 43 which is in communication with the canister.

In the fuel outflow-limiting device of this embodiment having the above construction, in a normal condition in which the liquid level of the gasoline is disposed below the float valve 5, and is still, the sum of the weights of the float valve 5, seal member 53, valve seat 57, valve member 58 and spring 50 overcomes the urging force of the spring 50, so that a gap is formed between the valve member 58 and the lower peripheral edge of the communication opening 43 as shown in FIG. 2. Therefore, gas within the gasoline tank 1 passes through the through holes 32 or the lower end opening of the tubular member 3 and through the communication holes 44, 47 and 48, and enters the upper member 40, and flows into the canister via the communication opening 43 and the nipple 20. As a result, the pressure within the gasoline tank 1 is prevented from increasing.

On the other hand, when the vehicle runs on a considerably-rugged road or when the vehicle runs along a curved road, the liquid surface of the gasoline is much disturbed to rise, and therefore even when the liquid level is disposed below a position where the float valve 5 is floated in the still condition, there is a possibility that the liquid gasoline enters the interior of the housing 4 via the lower end opening of the tubular member 3 or the through holes 32 of a small diameter. However, in the device of this embodiment, the seal member 53 of the float valve 5 closes the communication opening 43 when the liquid level of the liquid gasoline reaches a predetermined liquid level. Specifically, the float valve 5 and the seal member 53 are, floated by the liquid gasoline, so that the valve member 58 closes the communication opening 43, and therefore the liquid gasoline is prevented from flowing into the canister. Even in this condition in which the valve member 58 is held in intimate contact with the lower edge of the communication hole 43, when the liquid level descends, the float valve 5 moves downward apart from the seal member 53, so that the seal aperture 54 is opened, and as a result the pressure within the housing 4 becomes equal to the pressure within the nipple 20 communicating with the canister, and the valve member 58 is easily separated from the communication hole 43. Therefore, the response is high when the liquid surface of the gasoline is much disturbed to rise, and the dynamic sealing ability is excellent.

And besides, when the liquid level within the gasoline tank 1 is disposed at a position A–A', lower than the lower end opening of the tubular member 3, at the time of refueling, gas in the gas phase portion of the tank 1 flows into the canister via the lower end opening of the tubular member 3 as the liquid level rises, and therefore the refueling operation is continued in such a manner that the internal pressure of the tank 1 is not increased.

Then, when the liquid level of the gasoline reaches a position B–B', at which the lower end opening of the smaller-diameter portion 31 of the tubular member 3 is disposed, the smaller diameter portion 31 of the tubular member 3 is pronged into the liquid gasoline so that communication of the tubular member 3 to a gas phase located on an upper portion on the inside of the gasoline tank 1 is cut, whereby evacuation of vaporized gasoline decreases. Namely, during the refueling operation, gas in the gas phase portion of tank 1, enters the upper member 40 only via the through holes 32. However, each through hole 32 is formed into a smaller diameter than the lower end opening of the tubular member 3, and therefore offers a high ventilation resistance. Therefore, the pressure within the gasoline tank 1 increases, so that the filling-up of the tank can be detected, and the operation of a refueling gun is automatically stopped. Moreover, in this embodiment, when the level of gasoline closes the lower edge opening of the tubular member 3, a pressure in the housing 4 becomes lower as compared with other portions in the tank 1. Gasoline is sucked upward in the housing 4 by Venturi' effect, and the float valve 5 is moved upward and closes the communication opening 43. Therefore, the gasoline tank 1 is hermetically sealed and the internal pressure thereof is reliably increased. As a result, the filling-up of the tank can be detected precisely, and the operation of a refueling gun is automatically stopped.

For producing the fuel outflow-limiting device of this embodiment, first, the valve seat 57 and the valve member 58 are mounted on the float valve 5, and then the float valve is inserted into the tubular portion 46 of the lower member 41, and the upper member 40 and the lower member 41 are fitted together in fixed relation to each other. Then, this assembly is fitted into the larger-diameter portion 30 of the tubular member 3 in fixed relation thereto through the O-ring 42, and the end of the larger-diameter portion 30 is fixed by welding to the lid member 2. The thus formed module is inserted into the evaporation opening in the fuel tank 1, and the lid member 2 is welded to a peripheral edge portion of the evaporation opening.

Therefore, even if there exist various gasoline tanks 1 of different shapes and capacities, the device can be applied to any one of these tanks merely by adjusting the length of the tubular member 3, and the other parts can be used as common parts, and therefore the cost can be greatly reduced. And besides, the device can be fixed by welding to a portion of the gasoline tank 1 having a very small area, and therefore the mounting space is small, and the degree of freedom with respect to the mounting position is high.

(Second Embodiment)

Figure 3:
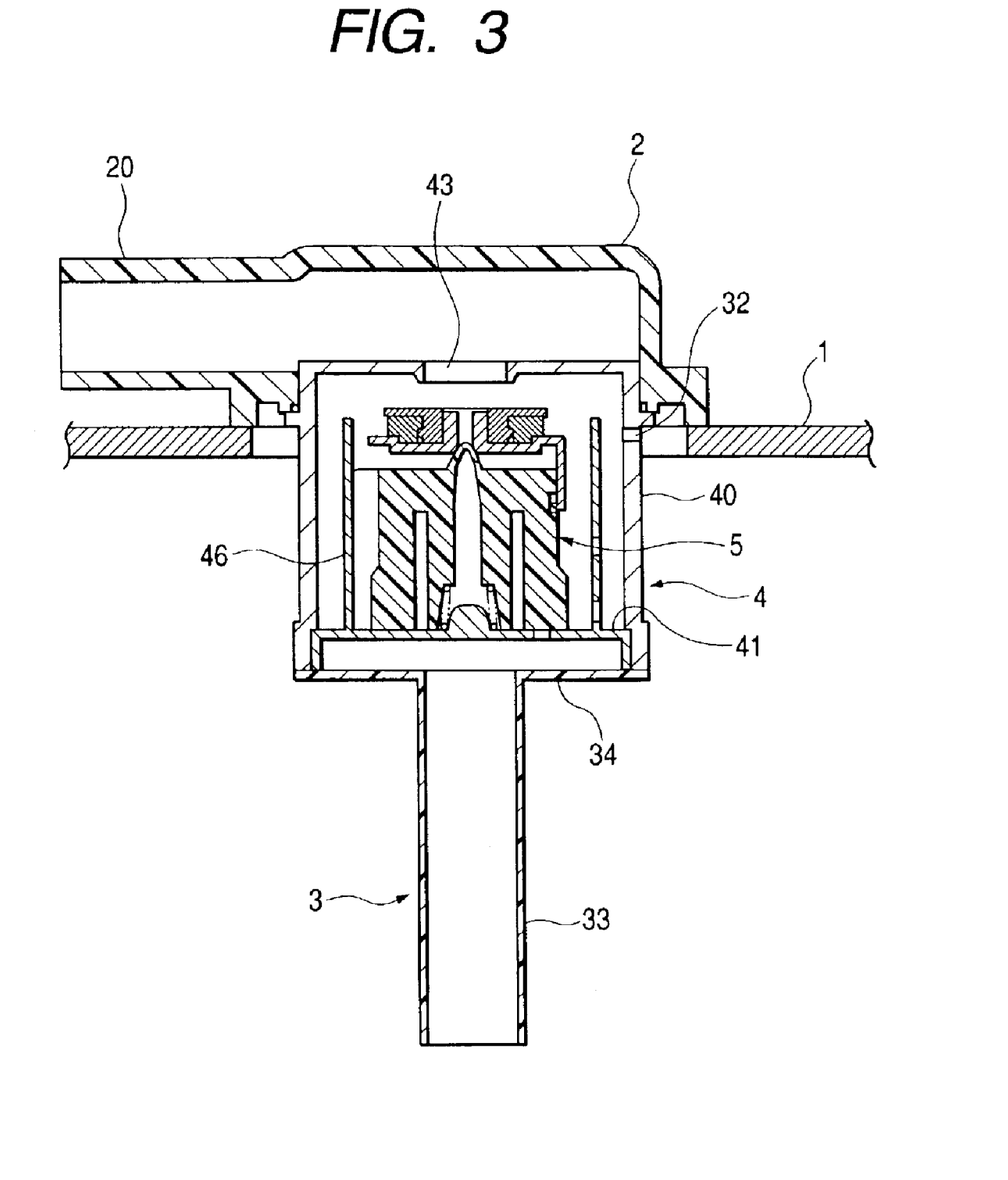
FIG. 3 is a cross-sectional view of a second embodiment of a fuel outflow-limiting device of the invention.

FIG. 3 shows a second embodiment of a fuel outflow-limiting device of the invention. In this device, a housing 4 comprises an upper member 40 and a lower member 41. A tubular member 3 includes a tubular portion 33, and a flange portion 34 formed at one end of the tubular portion 33, and the flange portion 34 is welded to ends of the upper and lower members 40 and 41. Through holes 32 of a small diameter are formed through a peripheral wall of the upper member 40. The other construction is similar to that of the first embodiment.

In this device, also, similar operational effects as in the first embodiment can be achieved.

Figure 4:
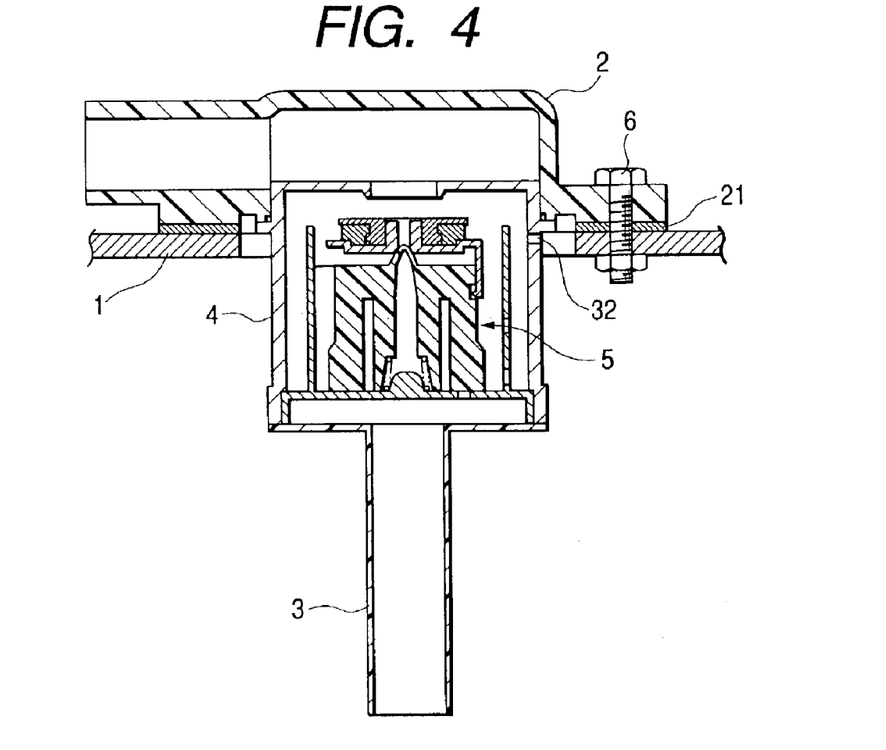
FIG. 4 is a cross-sectional view, showing another method of fixing the fuel outflow-limiting device of the second embodiment to a fuel tank.
Figure 5:
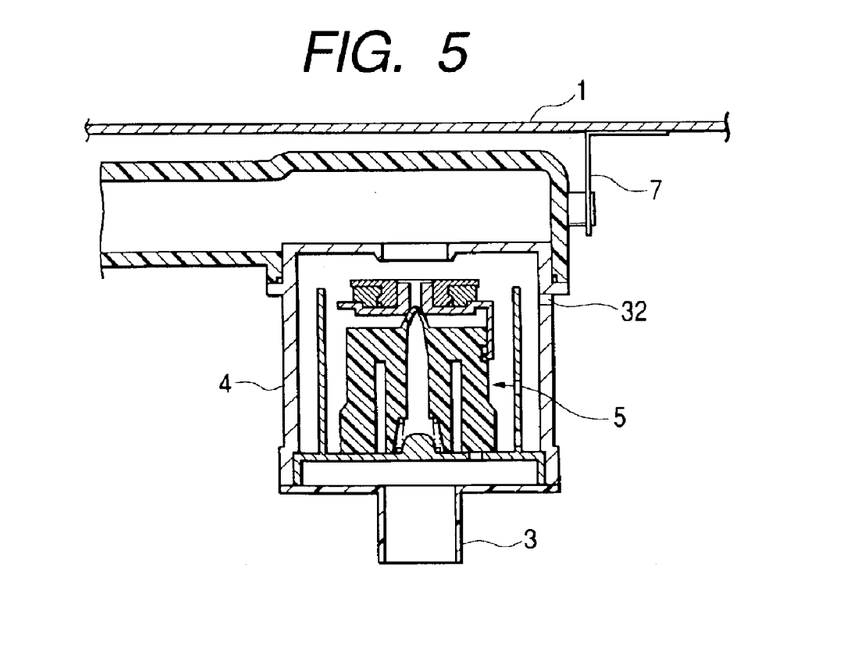
FIG. 5 is a cross-sectional view, showing a further method of fixing the fuel outflow-limiting device of the second embodiment to the fuel tank.

In the above embodiments, although the device is fixed to the gasoline tank 1 by welding the lid member 2 to the gasoline tank 1, a lid member 2 maybe fastened through a packing 21 to the gasoline tank 1 by bolts 6 or the like, as shown in FIG. 4. As shown in FIG. 5, the device can be fixedly mounted within the gasoline tank 1 in a suspended manner by the use of mounting metal members 7. In this case, the length of a tubular member 3 is smaller as compared with the second embodiment.

(Third Embodiment)

Figure 6:
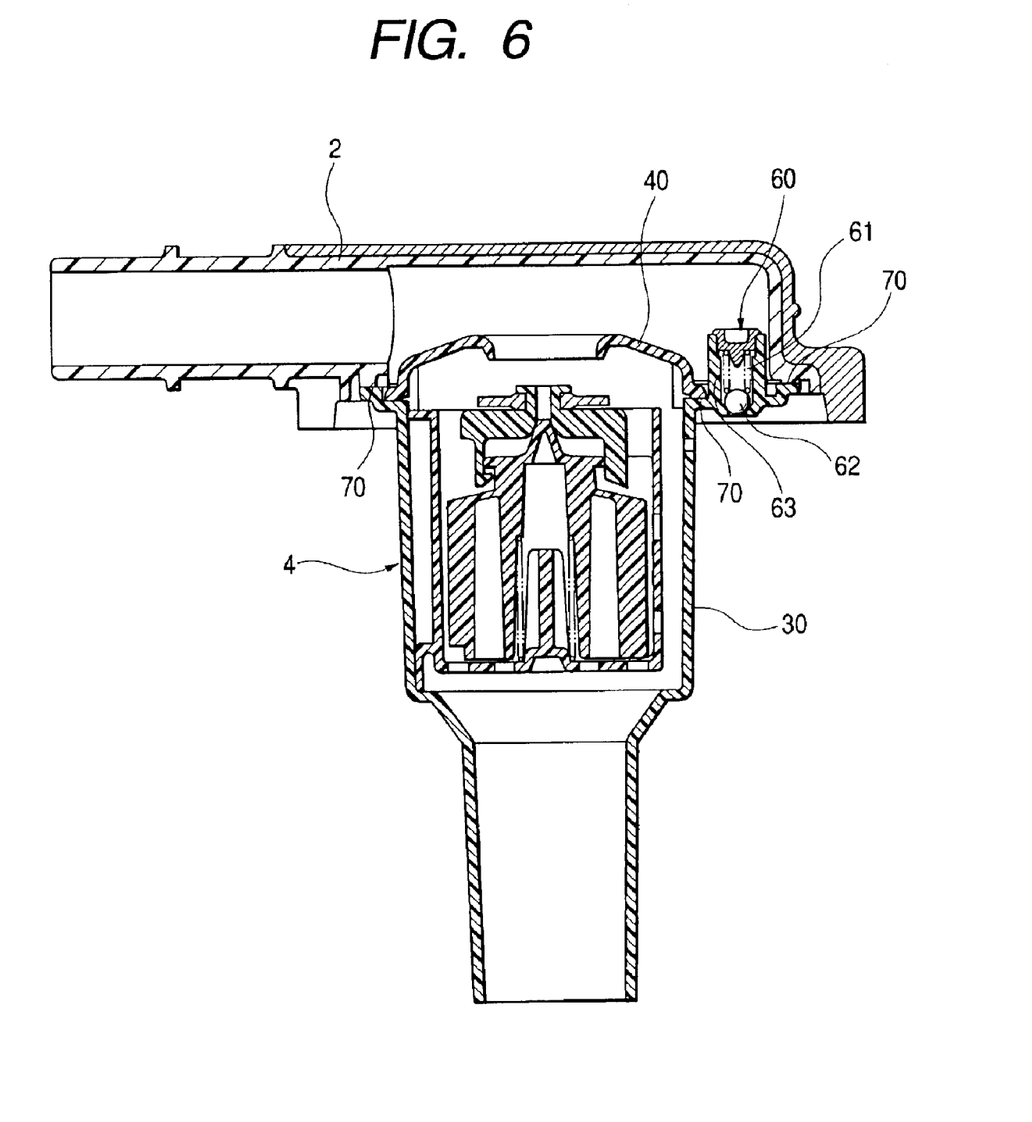
FIG. 6 is a cross-sectional view, showing a further method of fixing the fuel outflow-limiting device of the third embodiment to the fuel tank.

FIG. 6 shows a third embodiment of a fuel outflow-limiting device of the invention. In this device, a relief mechanism 60 is provided on the outer side of the housing 4 within the cover member 2. The relief mechanism 60 is constituted by a bleeding passage 61 connecting the inside and the outside of the tank 1 and a ball valve 62 urged by a spring 63 and configured to open and close the bleeding passage 61 in accordance with the internal pressure of the tank 1. The ball valve 62 is usually urged in a direction toward the inside of the tank 1 so as to close the opening of the bleeding passage 61 on the side of the tank 1. However, as the internal pressure of the tank 1 is increased beyond a predetermined pressure, the ball valve 62 is pressurized and displaced against the urging of the spring 63 in a direction allowing the bleeding passage 61 to open. The relief mechanism 60 connects the inside and the outside of the gasoline tank 1. Thus the relief mechanism 60 is opened so as to bleed the gas in the gasoline tank 1 when an internal pressure of the tank 1 rises beyond the predetermined pressure. By such the mechanism, it is prevented that the internal pressure of the tank becomes abnormally higher.

(Fourth Embodiment)

Figure 7:
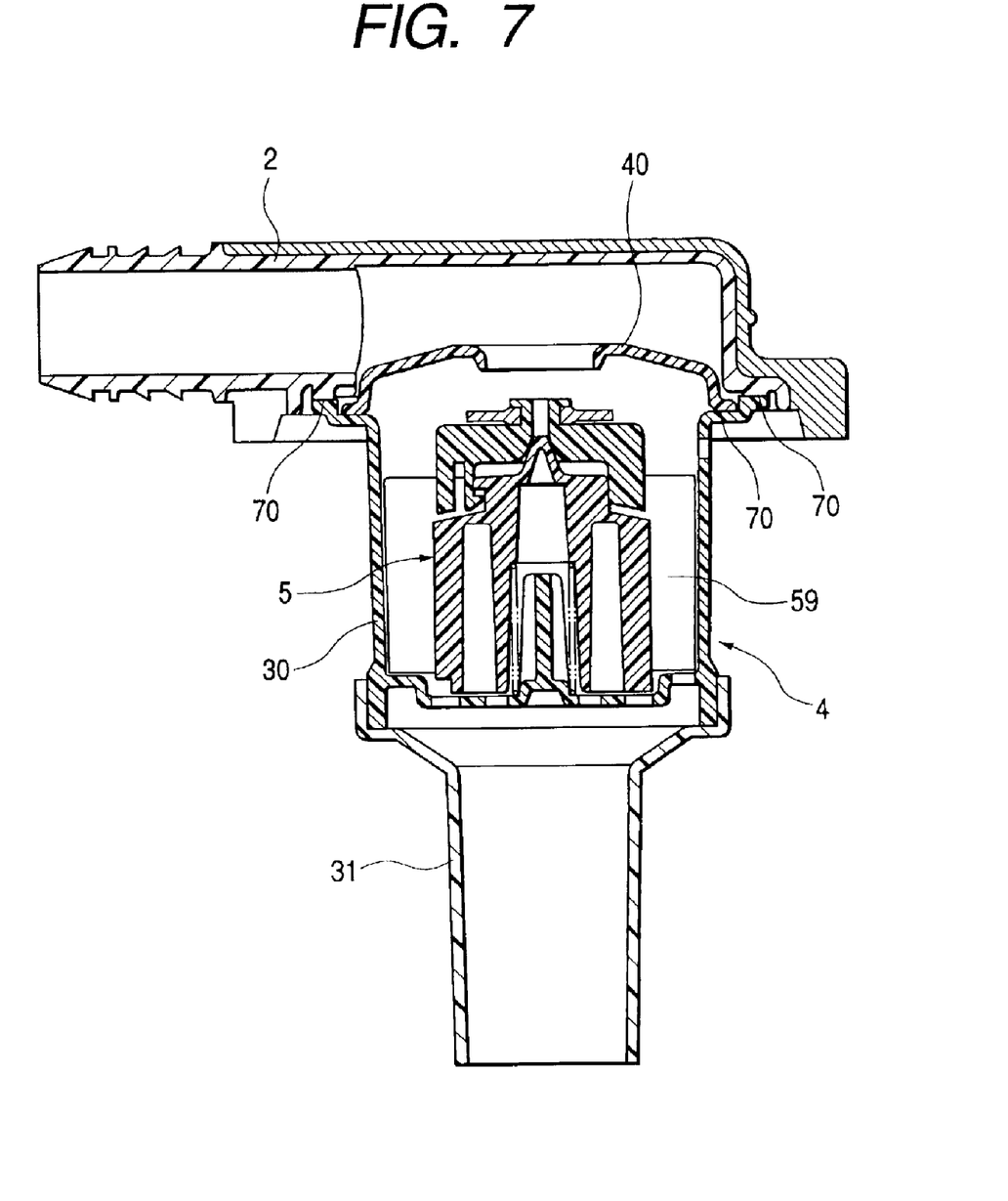
FIG. 7 is a cross-sectional view, showing a further method of fixing the fuel outflow-limiting device of the fourth embodiment to the fuel tank.

FIG. 7 shows a fourth embodiment of a fuel outflow-limiting device of the invention.

The float valve 5 is provided within the larger diameter portion 30. Instead of the ribs 51 in FIG. 2, a plurality of ribs 59 are extended vertically and radially from an outer peripheral surface of the float valve 5. The outer ends of the ribs 59 abut with the inner surface of the larger diameter portion 30 so that movement of the float valve 5 in the larger diameter portion 30 is guided upward and downward by the larger diameter portion 30. Basically number of the fins is not specifically limited by eight fins are radially provided in this embodiment. By such the structure, it is not necessary to form tubular portion for guiding the float valve such as the tubular portion 46 of the first embodiment as shown in FIG. 2. Therefore, the structure of the device can be simplified. Incidentally, in this embodiment, although the larger diameter portion 30 and the smaller diameter portion 31 are formed in two-piece, these members may be integrally formed.

Further, in the third and fourth embodiments, welded portions 70 among the cover member 2, the larger-diameter portion 30 and the upper member 40 in FIGS. 6 and 7 are welded by laser welding. By such the structure, it is not necessary to provide O-ring between the larger-diameter portion 30 and the upper diameter portion 40. Here, the housing 4 is formed with the upper portion 40 and the larger diameter portion 30. Therefore, not only similar operational effects as in the first and second embodiments can be achieved, but also the number of components can be reduced more in these embodiments.

With respect to the connecting structures by which the lid member 2, the upper member 40, the lower member 41 and the tubular member 3 are joined together, any suitable engagement means, such as welding and claw-engagement means, other than those of the above embodiments can be used.

Namely, in the fuel outflow-limiting device of the present invention, the full-tank detection and the cutoff operation can be effected by the single device of the unitary construction, and besides only one opening need to be formed in the fuel tank, and therefore this device is very effective from the viewpoint of the mounting space. Furthermore, the device can be applied to various fuel tanks merely by adjusting the length of the tubular member, and therefore the time and labor are much reduced, and the cost can be greatly reduced.

What is claimed is:

1. An outflow-limiting device of a fuel comprising:
    a housing, which is fixed to an upper wall of the fuel tank and which has a communication opening in communication with a canister;
    a float valve, which is a single body that is received within the housing, floats on liquid fuel, and moves upward end downward in accordance with upward and downward movement of a liquid level of the liquid fuel to close and open the communication opening;
    a tubular member, which communicates with the housing and extends directly and straightly downward from the housing into an interior of the fuel tank, wherein an outer diameter of the tubular member is less than an inner diameter of the housing, and wherein a lower end opening is formed at a lower end of the tubular member directly below the housing; and a through hole of a predetermined diameter, wherein the through hole is located near an inner surface of the upper wall of the fuel tank, and the through hole permits an inside and outside of the housing to communicate with each other, and the diameter of the through hole is less than the diameter of the lower end opening, and wherein when the liquid level of the fuel in the fuel tank reaches the lower end opening of the tubular member, the pressure within the fuel tank increases, so that the tubular member permits filling-up of the fuel tank to be detected, and when the liquid level of the fuel rises beyond a predetermined normal level, the float valve closes the communication opening.

2. An outflow-limiting device of a fuel tank according to claim 1, wherein the tubular member is separate from the housing and is hermetically fixed to the housing.

3. An outflow limiting device according to claim 1, wherein the float valve includes two parts that move relative to one another.

4. An outflow limiting device according to claim 1, wherein the tubular member is tapered such that the diameter of the tubular member is less at locations that are closer to the opening end.

5. An outflow-limiting device according to claim 1, wherein the diameter of the tubular member is uniform.

6. An outflow-limiting device of a fuel tank comprising:
a housing, which is fixed to an upper wall of the fuel tank and which has a communication opening in communication with a canister;
a float valve, which is a single body that is received within the housing, floats on liquid fuel, and moves unward and downward in accordance with upward and downward movement of a liquid level of the liquid fuel to close and open the communication opening;
a tubular member, which communicates with the housing and extends downwardly from the housing into an interior of the fuel tank, wherein the tubular member has a body, the outer diameter of which is less than an inner diameter of the housing, and wherein a lower end opening is formed at a lower end of the tubular member directly below the housing and the body of the tubular member; and
a through hole of predetermined diameter, wherein the through hole is located near an inner surface of the upper wall of the fuel tank, and the through hole permits and inside and outside of the housing to communicate with each other, and the diameter of the through hole is less than the diameter of the lower end opening, and wherein when the liquid level of the fuel in the fuel tank reaches the lower end opening of the tubular member, the pressure within the fuel tank increases, so that the tubular member permits filling-up of the fuel tank to be detected, and when the liquid level of the fuel rises beyond a predetermined normal level, the float valve closes the communication opening, wherein an upwardly-open tubular portion is formed within the housing and is disposed around an outer periphery of the float valve.

7. An outflow-limiting device of a fuel tank, comprising:
a housing in which a float valve chamber is formed and which is provided with a communication opening to an outside of the fuel tank;
a tubular member communicating and extending directly and straightly downward from the housing, wherein an outer diameter of the tubular member is less than in inner diameter of the housing, and wherein the tubular member has a lower end opening at a lower end thereof, and the lower end opening is directly below the housing;

a through hole having a predetermined diameter formed at a position above the lower end opening to communicate with the tubular member or the float valve chamber, wherein the through hole is located near an inner surface of an upper wall of the fuel tank, and wherein the diameter of the through hole is less than the diameter of the lower end opening;
a float valve, which is a single body provided in the float valve chamber; and
a seal member attached to the float valve for closing the communication opening such that when the liquid level of the fuel rises beyond a predetermined normal level, the seal member of the float valve closes the communication opening;
wherein the tubular member penetrates liquid fuel in the fuel tank when the liquid level of the fuel reaches a first liquid level so that communication of the tubular member with a gas phase region located at an upper portion of the inside of the fuel tank is cut, whereby evacuation of vaporized fuel decreases.

8. An outflow-limiting device according to claim 7, wherein the float valve is urged upward in the liquid level direction with a spring.

9. An outflow-limiting device according to claim 8, wherein an apparent buoyancy of the float valve and the seal member is generated by buoyancy of the float valvo and urging of the spring, so that the seal member is biased to close the communication opening when the liquid fuel reaches at the second liquid level.

10. An outflow-limiting device according to claim 7, wherein the float valve includes a seal aperture connected to the communication opening, wherein the seal aperture has a smaller diameter than the communication opening, and wherein the float valve further includes a seal projection that is configured to open and close the seal aperture.

11. An outflow-limiting device according to claim 7, wherein a plurality of fins radially extends from an outer peripheral surface of the float valve, and
outer ends of the fins abut with an inner surface of the housing so that movement of the float valve is guided.

12. An outflow-limiting device according to claim 7, further comprising a relief mechanism connecting the inside and the outside of the fuel tank wherein the relief mechanism is opened to bleed the gas in the fuel tank when the internal pressure of the fuel tank rises beyond a predetermined pressure.

13. An outflow-limiting device according to claim 7, wherein a valve member of the seal member is constituted by a rubber material.

14. An outflow-limiting device according to claim 7, wherein the float valve is constituted by a POM resin.

15. An outflow-limiting device according to claim 7, wherein the length of the tubular member is determined to correspond to the first liquid level.

16. An outflow-limiting device according to claim 7, wherein the fuel tank is located in an automobile and the communication opening is communicated with a canister.

17. An outflow limiting device according to claim 7, wherein the float valve includes two parts that move relative to one another.

18. An outflow limiting device according to claim 7, wherein the tubular member is tapered such that the diameter of the tubular member is less at locations that are closer to the opening end 19. An outflow-limiting device according to claim 7, wherein the diameter of the tubular member is uniform.

* * * * *